US010990922B1

(12) United States Patent
Subramanian et al.

(10) Patent No.: US 10,990,922 B1
(45) Date of Patent: Apr. 27, 2021

(54) CONTINUOUS INVENTORY MANAGEMENT

(71) Applicant: ROAMBEE Corporation, Santa Clara, CA (US)

(72) Inventors: Vidya Subramanian, Santa Clara, CA (US); Sanjay Sharma, Santa Clara, CA (US)

(73) Assignee: ROAMBEE Corporation, Santa Clara, CA (US)

( * ) Notice: Subject to any disclaimer, the term of this patent is extended or adjusted under 35 U.S.C. 154(b) by 0 days.

(21) Appl. No.: 16/266,025

(22) Filed: Feb. 2, 2019

(51) Int. Cl.
*G06Q 10/08* (2012.01)
*G06K 19/07* (2006.01)
*H04W 4/029* (2018.01)
*H04W 4/021* (2018.01)

(52) U.S. Cl.
CPC ....... *G06Q 10/087* (2013.01); *G06K 19/0717* (2013.01); *G06K 19/0723* (2013.01); *H04W 4/021* (2013.01); *H04W 4/029* (2018.02)

(58) Field of Classification Search
CPC .................................................... G06Q 10/087
USPC .......................................................... 235/385
See application file for complete search history.

(56) References Cited

U.S. PATENT DOCUMENTS

| 7,711,654 | B2 * | 5/2010 | Schmidtberg | G06Q 10/08 |
| | | | | 705/333 |
| 9,182,231 | B2 * | 11/2015 | Skaaksrud | B65B 25/02 |
| 9,846,854 | B1 * | 12/2017 | Lee | G06Q 10/083 |
| 10,387,822 | B1 * | 8/2019 | Bolton | G06Q 10/08355 |
| 2006/0139147 | A1 * | 6/2006 | Sterzinger | G07C 9/00896 |
| | | | | 340/5.72 |
| 2015/0084769 | A1 * | 3/2015 | Messier | G08B 21/0446 |
| | | | | 340/539.13 |
| 2018/0041965 | A1 * | 2/2018 | Korneluk | G01S 5/0294 |

* cited by examiner

*Primary Examiner* — Michael G Lee
*Assistant Examiner* — David Tardif

(57) ABSTRACT

A system, including, associating a wireless tracker with an asset, wherein the wireless tracker emits a tracker identification and a sensor payload including a fixed identification, receiving by at least one of a plurality of mobile devices the tracker identification, the sensor payload and an associated location of the at least one of the plurality of mobile devices and monitoring the tracker identification and the associated location of the at least one of the plurality of mobile devices.

20 Claims, 8 Drawing Sheets

CONTINUOUS INVENTORY MANAGEMENT

TECHNICAL FIELD OF THE APPLICATION

This application relates to continuous inventory management, more specifically, utilizing multiple mobile devices to relay inventory management information.

BACKGROUND OF THE APPLICATION

Conventional inventory management relies upon human input and intervention in tracking the location and movement of assets. Human tracking lends itself to errors which in turn lead to inefficiencies in the management and movement of inventory.

Conventional truck load tracking does not provide automated feedback of movement, location or the condition of the shipment in transit such as if the shipment is not within its shipping temperature, humidity, moisture limits, or if the shipment was moved from one transport carrier to another, or the shipment was not handled properly.

Accordingly, there is a need for systems, methods, and devices for improved techniques to track inventory utilizing multiple mobile devices listening for wireless signals from inventory affixed wireless trackers without the need for human intervention.

SUMMARY OF THE APPLICATION

A first example embodiment of the present application provide at least a method, including associating a wireless tracker with an asset, wherein the wireless tracker emits a tracker identification and a sensor payload including a fixed identification, receiving by at least one of a plurality of mobile devices the tracker identification, the sensor payload and an associated location of the at least one of the plurality of mobile devices and monitoring the tracker identification and the associated location of the at least one of the plurality of mobile devices.

A second example embodiment of the present application provide at least a system, a mobile device having a non-transitory computer readable medium comprising instructions that, when read by a processor, cause the processor to; receive a tracker identification and sensor payload from a wireless tracker at the mobile device, determine a location of the mobile device when the tracker identification and sensor payload was received and transmit the tracker identification, sensor payload and the determined location of the mobile device to a cloud server.

A third example embodiment of the present application provide at least a non-transitory computer readable medium comprising instructions that, when read by a processor, cause the processor to perform associating a wireless tracker with an asset, wherein the wireless tracker emits a tracker identification and a sensor payload including a fixed identification, receiving by at least one of a plurality of mobile devices the tracker identification, the sensor payload and an associated location of the at least one of the plurality of mobile devices and monitoring the tracker identification and the associated location of the at least one of the plurality of mobile devices.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
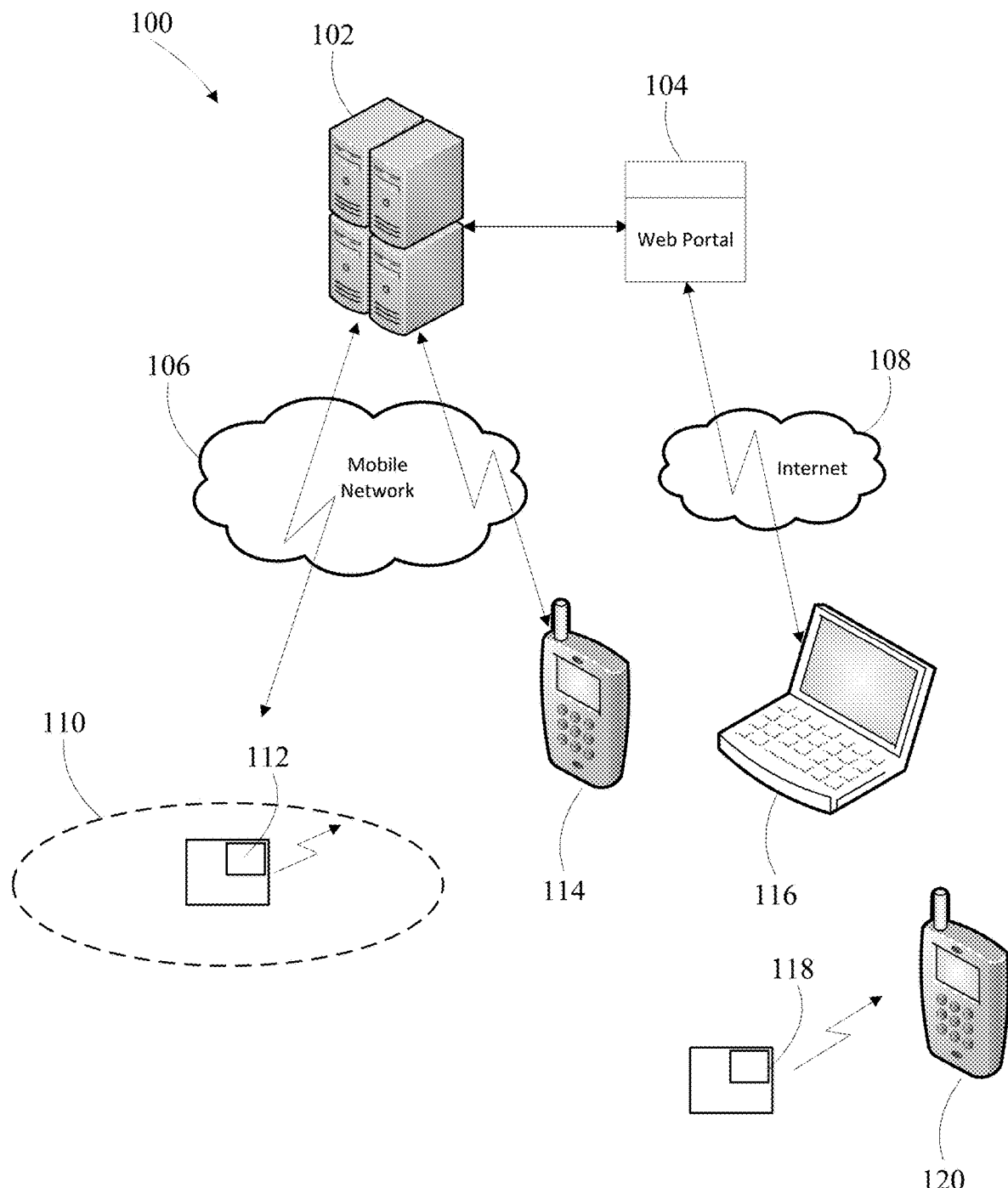
FIG. 1 is a functional block diagram of a system for continuous inventory management, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE APPLICATION

The illustrative embodiments described in the detailed description, drawings, and claims are not meant to be limiting. Other embodiments may be utilized, and other changes may be made, without departing from the scope of the subject matter presented herein. It will be readily understood that the aspects of the present disclosure, as generally described herein, and illustrated in the Figures, can be arranged, substituted, combined, separated, and designed in a wide variety of difference configurations, all of which are explicitly contemplated herein. Further, in the foregoing description, numerous details are set forth to further describe and explain one or more embodiments. These details include system configurations, block module diagrams, flowcharts (including transaction diagrams), and accompanying written description. While these details are helpful to explain one or more embodiments of the disclosure, those skilled in the art will understand that these specific details are not required in order to practice the embodiments.

As will be appreciated by one skilled in the art, aspects of the present disclosure may be embodied as an apparatus that incorporates some software components. Accordingly, some embodiments of the present disclosure, or portions thereof, may combine one or more hardware components such as microprocessors, microcontrollers, or digital sequential logic, etc., such as processor with one or more software components (e.g., program code, firmware, resident software, micro-code, etc.) stored in a tangible computer-readable memory device such as a tangible computer memory device, that in combination form a specifically configured apparatus that performs the functions as described herein. These combinations that form specially-programmed devices may be generally referred to herein as "modules". The software component portions of the modules may be written in any computer language and may be a portion of a monolithic code base, or may be developed in more discrete code portions such as is typical in object-oriented computer languages. In addition, the modules may be distributed across a plurality of computer platforms, servers, terminals, mobile devices and the like. A given module may even be implemented such that the described functions are performed by separate processors and/or computing hardware platforms.

Embodiments of the present disclosure include systems, methods, and devices for continuously monitoring inventory using crowdsource cell phones. In such embodiments the method includes, associating a wireless tracker with an asset, wherein the wireless tracker emits a tracker identification and a sensor payload including a fixed identification, receiving by at least one of a plurality of mobile devices the tracker identification, the sensor payload and an associated location of the at least one of the plurality of mobile devices and monitoring the tracker identification and the associated location of the at least one of the plurality of mobile devices.

The process and system of the present disclosure leverages existing resources in multiple ways. Currently, mobile phones are the single largest group of high speed computing devices deployed. Contained within mobile devices are a number of universal communication technologies as Bluetooth low energy (BLE), global system for mobile communications (GSM) and wireless fidelity (WiFi), since these technologies are resident on many mobile phones they enable devices that support them to communicate.

The internet of things (IoT) encompasses sensors communicating through the cloud. One possible communication extension is to utilize sensors as the cloud, a mesh network imitating aspects of the internet in which many computers provide the network.

Recognizing the ever increasing number and diversity of communication channels and gateways, one possible solution is to utilize available gateways such as mobile phones, WiFi access points or available networks to allow continuous communication with an asset. As such, leveraging of the ever increasing and diverse communications infrastructure allows continuous inventory management without the need to place fixed communications equipment within communications distance of the asset.

The continuous inventory management in one embodiment includes a video scan of the product to perform continuous inventory tracking.

The current disclosure shows a system that enables mobile devices to be receiving antennas for inventory tracking. Allowing global customers to leverage an existing infrastructure to gain access to inventory data using any mobile device with the mobile application.

The overall components of the system include a local server, a cloud server that can accept data from a mobile application, beacons or wireless trackers with sensors and a mobile application that can run on smart phones in the background and listens to BLE transmissions.

The mobile application may run on a smartphone in the background and listens to BLE transmissions.

In an example process BLE beacons are affixed to objects which transmit their ID and sensor data periodically. A mobile application running on a mobile device listens for the BLE Beacon transmissions and filters out non wireless tracker or beacon transmissions. The mobile application then re-transmits the information to the cloud server.

The mobile application when installed as part of the operating system of a mobile device will work in the background and listen for BLE transmissions. This listening enables the locating of an asset through multiple mobile devices in a global setting. The application will not know the asset type or the owner, just the ID and the location of the asset as a security measure. This enables crowd soured inventory without specialized applications that the mobile device owner has to install and manage.

FIG. 1 is a functional block diagram of a system 100 for tracking a shipment using a wireless tracker, in accordance with some embodiments. Such a system 100 includes one or more computer servers 102 that may host a web portal 104 or other user portal. A user device (114-116) such as a smartphone, tablet computer, laptop computer, and desktop computer may access the web portal 104 over the Internet 108. Alternatively, a user device 114 may access the computer server(s) 102 across a mobile network 106. In addition, a geo-fence origin area 110 may be set around the asset having the wireless tracker 112 which has a wireless signal that is received by user device 114 or 116 and is in communication with the computer server(s) 102 over the mobile network 106. Such a system may be used by a shipping delivery company or a company that frequently ships various assets among the company's facilities that are separated by geographic distances. As the asset is moved its wireless signal from the wireless tracker is sensed by mobile device 120 which relays an identification, data packet and location of the cell phone at the time of reception of the wireless signal to the cloud server.

In one embodiment, the wireless tracker 112 may determine its location using a global positioning system (GPS) device or communicating with one or more GPS devices over a network. Further, the wireless tracker may include a battery such that the wireless tracker 112 regulates battery usage based on the location of the wireless tracker 112. For example, when within a distance threshold of the shipment origin or shipment destination, the management module may request the communication module to determine a location of the wireless tracker 112 and ranging data at frequent intervals so as to provide frequent updates to a shipper on the location status of the shipment. However, beyond a distance threshold of the shipment origin and prior to a distance threshold of a shipment destination, frequent location status updates may not be needed by the shipper. Thus, the management module may not request the communication module to determine the location of the wireless tracker as frequently thereby regulating battery usage of the communication module. The location of the wireless tracker 112 may be forwarded to the computer server(s) 102 from the wireless tracker 112. Further, the computer server(s) may forward the location of the wireless tracker 112 to user devices (114-116).

In another embodiment, the wireless tracker 112 may include one or more sensors that are configurable. Further, the wireless tracker 112 may access and forward the sensor information. In addition, the wireless tracker 112 may determine a trigger event based on the location of the wireless tracker 112 or sensor information such as deceleration or movement of the truck door. In addition, the wireless tracker 112 may send or transmit a notification to the computer server 102 based on the trigger event. Further, the computer server(s) may forward the notification to user devices (114-

116). The wireless tracker 112 may send or transmit sensor data to the computer server 102. Further, the computer server(s) may forward the sensor data or other sensor data to user devices (114-116).

In additional embodiments, the wireless tracker 112 is configured to receive and verify one or more codes to for a chain of custody of the shipment. In one embodiment, the wireless tracker receives a code at a shipment origin and receives a code at a shipment destination. Based on such authentication, the wireless tracker may transmit a notification to the computer server(s) 102 verifying chain of custody.

Figure 2:
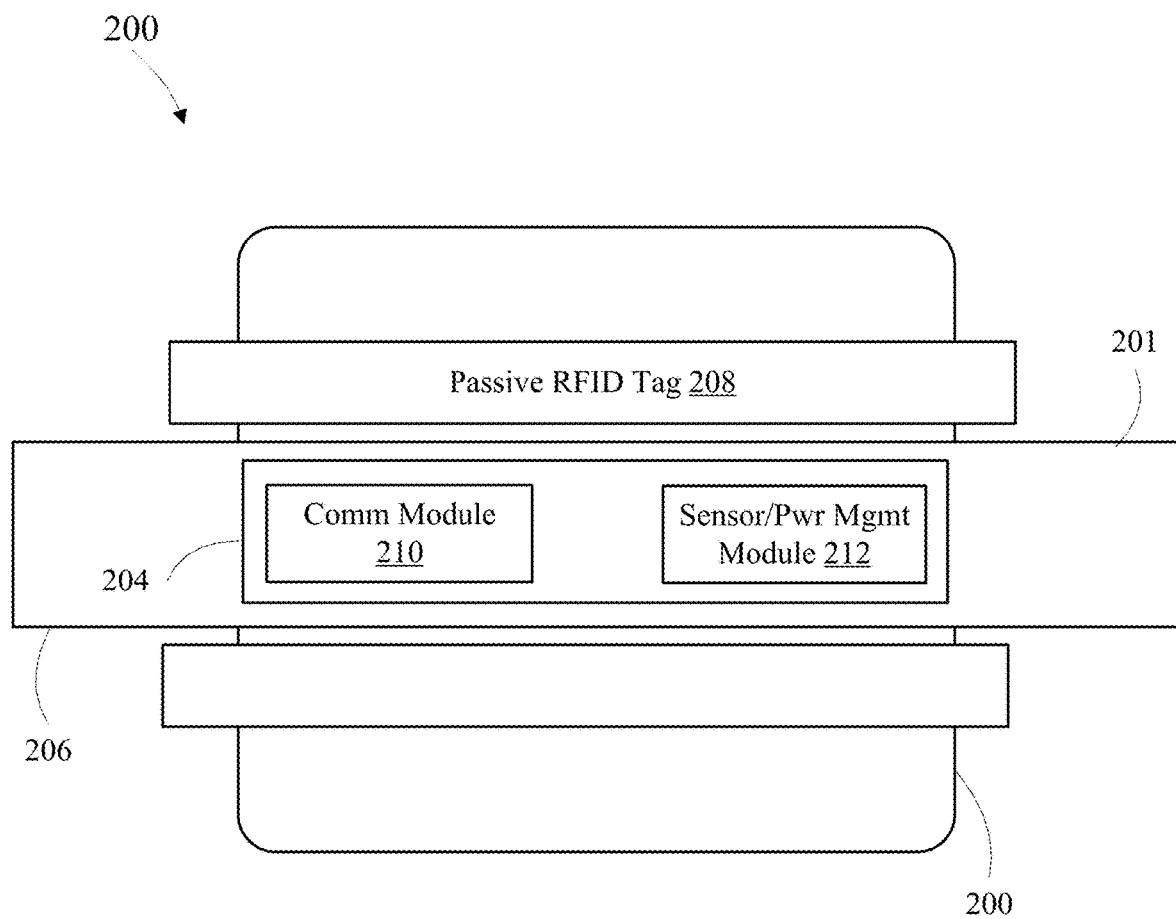
FIGS. 2-3 are functional block diagrams of a wireless tracker, in accordance with some embodiments.

FIG. 2 is a functional block diagram of a wireless tracker 200, in accordance with some embodiments. The wireless tracker 200 includes communication module 210 and authentication module 204 that is a bolted onto an integrated circuit board. A passive radio frequency identification (RFID) tag 208 is affixed to the truck door and programmed to have a unique identity/identification.

The wireless tracker 200 may be manufactured and operated in part by a third party manufacturer that may be used by a shipper or shipment delivery company. The third party manufacturer may own or operate one or more computer servers to communicate with the wireless tracker 200 over one or more wireless communication networks using the communication module 210. Further, the communication module 210 may be include one or communication interfaces configured to communicate over various wireless networks such as GPS, Zigbee, Zwave, WiFi, cellular/mobile, Bluetooth, WiMAX or any other wireless communication network. In addition, the communication module may have an interface to communicate with other devices over a wired network or a wired interface such as an Ethernet cable or USC interface. Such wired connections may be implemented when first configuring the wireless tracker 200 by the third party manufacturer prior to use.

In some embodiments, the communication module 210 is configured to determine a current location of the wireless tracker device at one or more intervals wherein the one or more intervals are based on a delivery route of the shipment. For example, the communication module 210 may be configured (by the management module 212) to determine the location of the wireless tracker frequently within a distance threshold of the shipment origin or shipment destination. However, the communication module 210 may be configured to determine the location of the wireless tracker not as frequently beyond the distance threshold of the shipment origin and prior to the distance threshold of the shipment destination. Although such a configuration manages battery life, such a configuration also avoids a situation when a user defines an alert condition when an asset enters and exits a specified geographic boundary that may not have been provided if the update interval was simply 30 minutes. In such a scenario, if the asset enters and exits the specified geographic boundary within 30 minutes then the tracing device fails to provide an update.

In an alternative embodiment, the management module 212 may receive sensor information from one or more sensors of the wireless tracker 200 at different time intervals. However, the management module may request sensor information for specific sensors only after the wireless tracker has moved to a different location thereby regulating battery life. For example, the wireless tracker 200 may include sensors. The management module 212 may be configured to only retrieve sensor information when the wireless tracker has moved to a new location instead of at certain time intervals (e.g. every 30 minutes). Thus, the wireless tracker may stay at a certain location for a period of time (e.g. longer than 30 minutes) and the management module regulates battery usage/life by only gathering sensor data when the wireless tracker has changed location. However, in other embodiments, the management module may request sensor information from sensors at certain time intervals associated or not associated with the location of the wireless tracker.

The wireless tracker 200 may have one or more sensors that include but are not limited to, temperature sensors, humidity sensors, location sensors, proximity sensors, accelerometers, acoustic, sound, vibration, automotive, transportation, chemical, electric current, electric potential, magnetic, radio, environment, weather, moisture, flow, fluid velocity, ionizing radiation, subatomic particles, navigation instruments, position, angle, displacement, distance, speed, acceleration, optical light, imaging, photon, pressure, force, density, level, thermal, heat, temperature, proximity, ranging and presence, etc. In one embodiment the sensor may include a location sensor. In another embodiment, the location sensor may be the communication module 210 communicating with a GPS device to retrieve location information of the wireless tracker 200. The management module 212 may be configured to configure the one or more sensors as well as receive sensor information from the one or more sensors. Further, the management module 212 may determine a trigger event based on the location of the wireless tracker device and/or sensor information. In addition, the management module 212 may transmit a notification to a computer server through the communication module based on the trigger event that is forwarded to a user device. Alternatively, sensor information may be provided to a computer server to determine a trigger event or notify the user. Moreover, a trigger event includes, but is not limited to, a shipment exiting shipment origin, delay at an intermediate location, traveling after a delay, temperature deviation, humidity deviation, route deviation, accident to delivery vehicle, tampering and shock to the delivery vehicle. Sensor may include, but are not limited to, temperature sensors, humidity sensors, location sensors, proximity sensors, accelerometers, acoustic, sound, vibration, automotive, transportation, chemical, electric current, electric potential, magnetic, radio, environment, weather, moisture, flow, fluid velocity, ionizing radiation, subatomic particles, navigation instruments, position, angle, displacement, distance, speed, acceleration, optical light, imaging, photon, pressure, force, density, level, thermal, heat, temperature, proximity, anti-tampering, ranging and presence, etc.

The authentication module 204 is used to track the chain of custody of the shipment associated with the wireless tracker 200. In one embodiment, a shipper at a shipment origin may enter an authentication code into the authentication module 204. The authentication module 204 verifies the code either locally or transfers the authentication code to a computer server for verification. Once the authentication code is verified, the shipment with the wireless tracker 200 is shipped to the destination. In one embodiment, a packing slip inside the shipment includes another authentication code. Upon receiving the shipment at the shipment destination, a receiver of the shipment may open the shipment to access the authentication code on the packing slip. The authentication code is entered into the authentication module 204 and verified (either locally or at a server). In addition, the verification may include determining whether the wireless tracker 200 is within a distance threshold of the shipment destination in accordance with the shipment order.

The authentication code may or may not be on a package slip. Further, the authentication code may include, but is not limited to, an alphanumeric code (that can be randomly generated), a text code, a graphical code (such as bar code or QR code), and biometric code (such as a fingerprint, signature, retinal scan, facial recognition, voice recognition, etc.).

In further embodiments, the management module 212 may determine that the location of the wireless tracker 200 is within a distance threshold of the shipment destination. Further, the management module 212 may determine that a code was received by the authentication module 204 within a time threshold. The distance threshold and time threshold may be parameters for the wireless tracker that are configurable by a shipper or use of the wireless tracker 200. If the code was determined to be received by the authentication module 204 within both the distance threshold and time threshold then the management module 212 may transmit a notification to a computer server through the communication module 210 verifying chain of custody. Such a notification may be sent to a user device. However, if the code was not received by the authentication module 204 either within a distance threshold or within a time threshold then the management module 212 transmit a notification to a computer server through the communication module 210 indicating a break in the chain of custody that is forwarded to a user device.

In other embodiments, the wireless tracker 200 may determine tampering such as separating the wireless tracker from the shipment. Such determination may involve processing sensor information and other parameters such as, but not limited to, ambient light, conductive tape, irregular motion detection, position, loading and orientation of the goods of the shipment.

In further embodiments, the wireless tracker 200 may implement multi-dimensional tracking such as to determine and provide the ability to configure the rules of tracking based on but not limited to if-else-while of various parameter like speed, altitude, temperature, pressure, location, range of cargo from the back door and change the behavior of tracking. For example, international tracking intervals is changed while at sea, dynamically changing the tracking geo-boundaries and conditions.

In additional embodiments, the wireless tracker 200 can associated its ID (e.g. RFID) with a shipment order information such as order number, purchase order number, Serial Shipment Container Code (SSCC), Billing of Lading number, Lorry Receipt (LR) number, Shipment Manifest number and others. Also, the wireless tracker is associated with the order information of the shipment in-transit for easy lookup. The wireless tracker may be associated with a wireless tracker identifier (e.g. RFID) such that the wireless tracker identifier is associated with shipment order information. Further, a wireless tracker 200 provides the condition of the shipment in transit such as if the shipment is not within its shipping temperature, humidity, moisture limits, load constraints or if the shipment was moved from one transport carrier to another, or the shipment was not handled properly.

The RFID tag 208 is used to uniquely identify the wireless tracker 300. Thus, when the RFID tag is read at the shipment origin, the RFID tag is stored by the computer server and associated with the shipment. The RFID tag 208 may be read again at the shipment destination to verify the RFID tag is the same as the one read at the shipment origin. The presence of RFID tag allows the wireless tracker owner to check in wireless tracker devices received after use or check out wireless tracker devices to customers for use with ease. It also provides real time inventory reconciliation and verification of device inventory at each wireless tracker device storage location.

Figure 3:
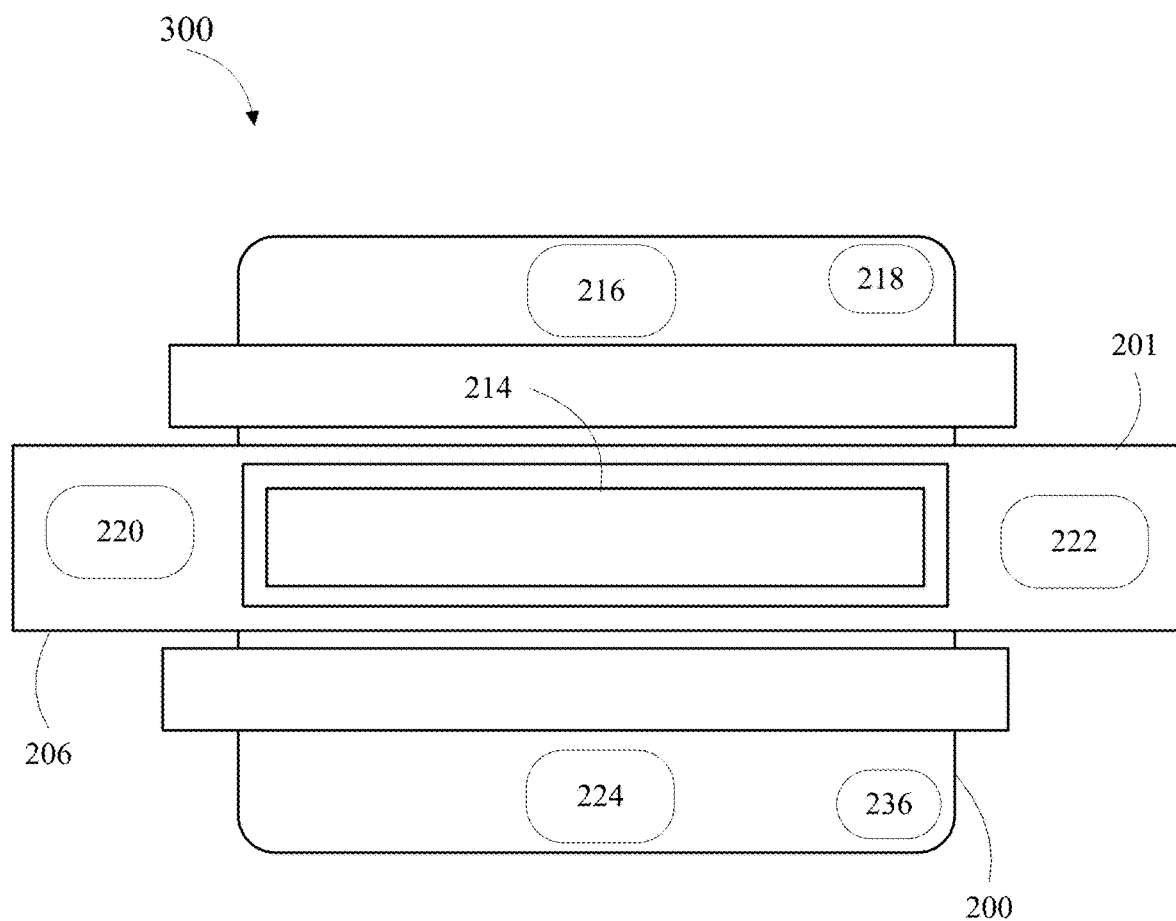

Referring to FIG. 3, a side of the wireless tracker 200 may have one or more panels (216-226) as well as a foam pad 214. The foam pad 214 may be used to cushion or otherwise reduce vibration impacting the wireless tracker 200.

Figure 4:
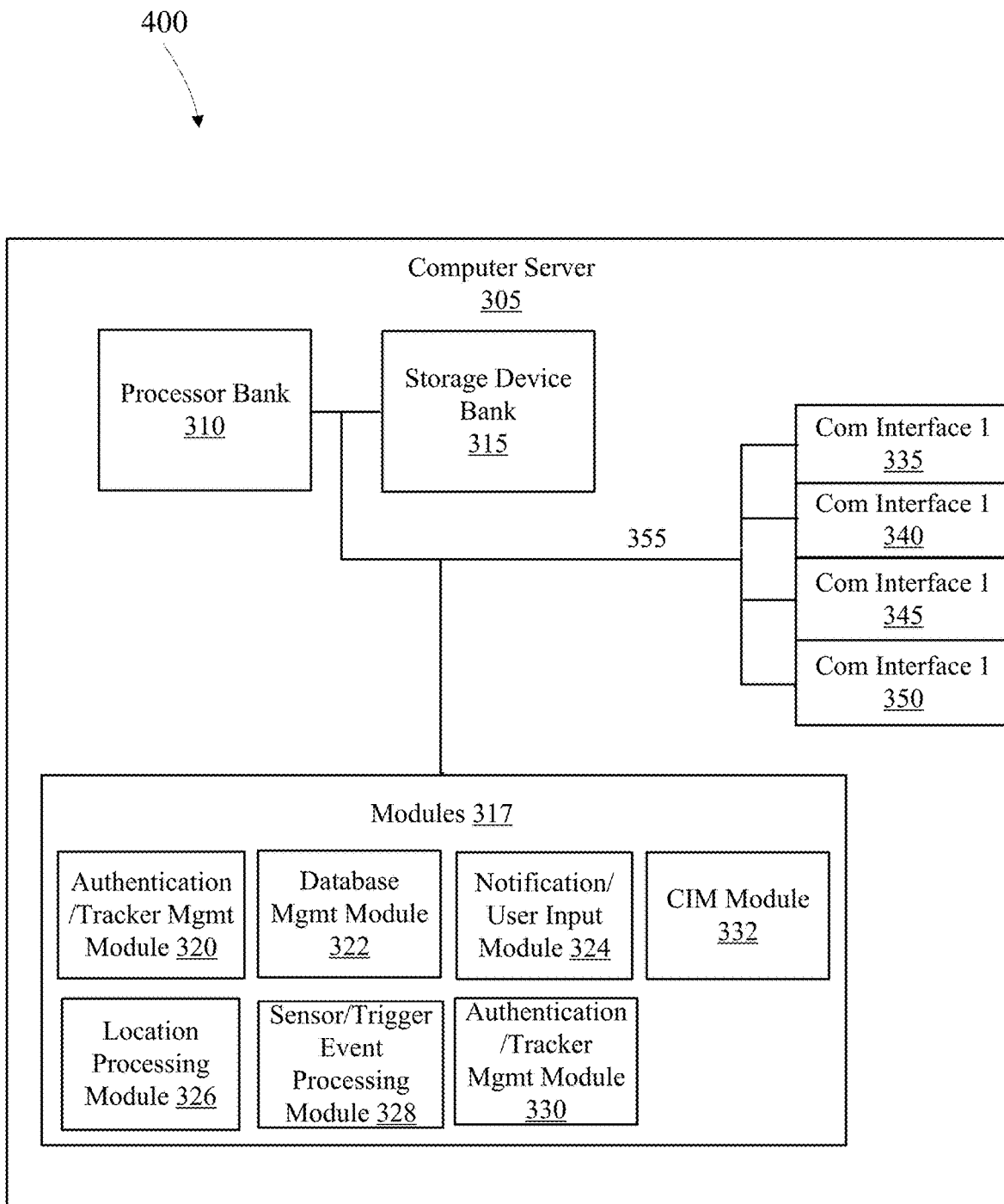
FIG. 4 depicts a functional block diagram of a server system used in continuous inventory management, in accordance with some embodiments.

FIG. 4 is functional block diagram of a computer server used in tracking a shipment using a wireless tracker, in accordance with some embodiments. Such a server 305 may be used in a system shown in FIG. 1. The computer server 305 may include several different components such as a processor bank 310, storage device bank 315, one or more software applications, which may be executed by a processor. Thus, the combination of the software applications as well as the processor and any other hardware form specifically-configured modules 317. The computer server 305 also has one or more communication interfaces (335-350). The processor bank 310 may include one or more processors that may be co-located with each other or may be located in different parts of the computer server 305. The storage device bank 315 may include one or more storage devices. Types of storage devices may include electronic memory, optical memory, and removable storage media. The one or more modules 317 may include, but are not limited to, authentication/tracker management module 320, database management module 322, notification/user input module 324, location processing module 326, sensor/trigger event processing module 328, and control module 330. The modules 317 may be implemented by the one or more processors in the processor bank 310. The computer server 305 and any other server described in the present disclosure may include a database stored in a storage device bank or may be coupled to a database. Further, such a computer server may be part of a computer server system described herein that may include one or more computer servers and one or more databases. In the present disclosure, a computer server may, but not always, refer to embodiments that include a computer server system having one or more computer servers and one or more databases coupled to each other. The one or more computer servers may be co-located with each other or distributed among different locations. Likewise, the one or more one or more databases may be co-located with each other or distributed among different locations. In further embodiments, some of the one or more computer servers may be co-located and coupled to the one or more databases while in additional embodiments some of the one or more computer servers may be coupled to the one or more databases each of which are placed in different location. In still further embodiments, a computer server system may refer to at least one of a computer server and a database. The components shown in FIG. 3 may be located in one computer server or be distributed among more than one computer server and/or databases.

The authentication/tracker management module 320 may perform, in some embodiments, the functions of the authentication module 204 and/or the management module 212 of a wireless tracker described herein. Thus, the authentication/tracker management module 320 may be used in tracking the chain of custody of the shipment associated with a wireless tracker. In one embodiment, a shipper at a shipment origin may enter an authentication code into the authentication module of the wireless tracker. Further, the wireless tracker (via its communication module) may transmit the authentication code to computer server 305. The authentication/tracker management module 320 verifies the authentication code and may provide the wireless tracker and/or a user device with a notification that the authentication code has been verified. Once, the authentication code is verified, the shipment with the wireless tracker is shipped to a shipment destination. In one embodiment, a packing slip inside the shipment includes another authentication code. Upon receiving the shipment at the shipment destination, a receiver of the shipment may open the shipment to access the authentication code on the packing slip. The authentication code is entered into the authentication module 204 of the wireless tracker. Further, the wireless tracker (via its communication module) may transmit the authentication code to computer server 305. The authentication/tracker management module 320 verifies the authentication code received at the shipment destination. Further, a notification may be sent to the wireless tracker or the user device that the chain of custody of the shipment has been verified.

The location processing module 326 may determine the location of the shipment based on one or more current locations received from the wireless tracker. Further, the location processing module 326 may access a Global Positioning System (GPS) information (e.g. map information) as well as geo-zone information surrounding one or more shipment locations (i.e. shipment origin, shipment destination, intermediate shipment locations). The location processing module 326 may process such information to determine one or more trigger events. Such trigger events may use the location processing module 326 to communicate with the notification/user input module 324 to send a notification based on the trigger event to a user device. In addition, once a location is determined by the location processing module 326, such location and associated location information may be provided to the authentication/tracker management module for further processing or the notification/user input module 324 to send a notification to the user device. For example, the location processing module 326 may receive a location of the shipment from the wireless tracker that indicates that the shipment is at the shipment origin. Further, the location processing module 326 has access to information that there is geo-zone surrounding the shipment origin. Subsequently, the location processing module 326 may receive a location of the shipment from the wireless tracker that indicates that the shipment has exited the geo-zone surrounding the shipment origin. The location processing module 326 determines that such an event is a trigger event and thereby communicates with the notification/user input module 324 to send a notification to the user device that the shipment has left the shipment origin.

In further embodiments, the authentication/tracker management module 320 may receive the location of the wireless tracker from the location processing module 326 and may determine that the location of the wireless tracker is within a distance threshold of the shipment destination. Further, the authentication/tracker management module 320 may determine that a code was received by the authentication/tracker management module 320 within a time threshold. The distance threshold and time threshold may be parameters that are configurable by a shipper or user of the wireless tracker. If the code was determined to be received and verified by the authentication/tracker management module 320 within both the distance threshold and time threshold then the authentication/tracker management 320 may transmit a notification (via the notification/user input module 324) to the user device verifying chain of custody. However, if the code was not received by the authentication/tracker management module 320 either within a distance threshold or within a time threshold then the authentication/tracker management module 320 transmit a notification (via the notification/user input module 324) to the user device indicating a break in the chain of custody.

In some embodiments, the authentication/tracker management module 320 is configured to determine a current location of the wireless tracker device at one or more intervals wherein the one or more intervals are based on a delivery route of the shipment. For example, the authentication/tracker management module 320 may configure the wireless tracker to determine its location frequently within a distance threshold of the shipment origin or shipment destination. However, the authentication/tracker management module 320 may configure the wireless tracker to determine its location infrequently beyond the distance threshold of the shipment origin and prior to the distance threshold of the shipment destination. Although such a configuration manages battery life of the wireless tracker, such a configuration also avoids a situation when a user defines an alert condition when an asset associated with the wireless tracker enters and exits a specified geographic boundary that may not have been provided if the update interval was simply 30 minutes. In such a scenario, if the asset enters and exits the specified geographic boundary within 30 minutes then the tracing device fails to provide an update.

In other embodiments, the wireless tracker provides an update regarding remaining battery life of the wireless tracker to the computer server 305. Further, the remaining battery life may be forwarded to a user device by the notification/user input module 324. The authentication/tracker management module 320 may determine to adjust (automatically or based on user input in response to the notification of remaining battery life) the frequency of location and sensor updates of the wireless tracker to better manage the remaining battery life and provides such configuration information to the wireless tracker, accordingly. Further based on a route of the wireless tracker (the route may be preprogrammed into the computer server 305 or determined by the computer server 305 based on one or more location updates provided by the wireless tracker), may provide configuration information to regulate the battery life of the wireless tracker. In additional embodiments, the computer server 305 may receive and process one or more location updates from the wireless tracker to determine a route deviation of the wireless tracker. The computer server may provide additional configuration information to further regulate the battery life based on the route deviation.

In further embodiments, the computer server 305 may receive the current location of the wireless tracker and the location processing module 326 determines that the current location of the wireless tracker is a shipment destination.

In additional embodiments, the computer server 305 may determine tampering of the wireless tracker such as separating the wireless tracker from the shipment. Such determination may involve processing sensor information and other parameters such as, but not limited to, ambient light, conductive tape, irregular motion detection, and orientation of the goods of the shipment.

In further embodiments, the computer server 305 may implement multi-dimensional tracking of the wireless tracker such as to determine and provide the ability to configure the rules of tracking based on but not limited to if-else-while of various parameter like speed, altitude, temperature, pressure, location and change the behavior of tracking. For example, international tracking intervals is changed while at sea, dynamically changing the tracking geo-boundaries and conditions.

In additional embodiments, the wireless tracker can associated its ID (e.g. RFID) with a shipment order information such as order number, purchase order number, Serial Shipment Container Code (SSCC), Billing of Lading number, Lorry Receipt (LR) number, Shipment Manifest number and others, and provides such information to the computer server for further processing and notification to the user. Also, the wireless tracker is associated with the order information of the shipment in-transit for easy lookup. Further, a wireless tracker provides to the computer server 305 the condition of the shipment in transit such as if the shipment is not within its shipping temperature, humidity, moisture limits, or if the shipment was moved from one transport carrier to another, or the shipment was not handled properly such that the computer server notifies or takes action on such information.

The database management module 322 manages the storage and access of information related to the operation of the wireless tracker or shipment information. For example, the database management module 322 may store one or more locations of the shipment that is provided by a wireless tracker. In addition, the database management module 322 may store information from one or more sensors coupled to and provided by the wireless tracker. Such location information and sensor information may be used to determine a trigger event to notify the shipper.

The notification/user input module 324 may perform several different functions. One such function may be to receive user input from a user device. Such user input may be configuration parameters for operating the wireless tracker. These may include specified times or locations to query the wireless tracker for sensor information, location, or other status information. Another function of the notification/user input module 424 to provide a notification based on a trigger event to the user device. A notification may be generated based on a trigger event determined by the different modules of the computer server 305 such as, but not limited to, the authentication/tracker management module 320, location processing module 326, and the sensor/trigger event processing module 328.

The sensor/trigger event processing module 328 may receive sensor information from the wireless tracker. Further, the sensor/trigger event processing module may determine certain trigger events based on the received sensor information and send a notification (via the notification/user input module 324) to a user device. In addition, the sensor/trigger event processing module may be programmed or receive configuration parameters to be forwarded to the wireless tracker for its operation. For example, the configuration parameters may include time and location of providing location and other sensor information as well as at which time periods to operate the different sensors to regulate battery life.

In some embodiments, the computer server 305 may receive a notification from the wireless tracker. Further, the computer server 305 may process the information in the notification based on configuration parameters and transmit information to the wireless tracker to take some further action. For example, a user may be tracking a shipment traveling from Las Vegas to Washington, D.C. (by air transport) with an intermediate stop in Dallas during the winter season. However, the computer server 305 may receive a notification that the shipment was diverted to have an intermediate stop at Chicago instead of Dallas due to severe weather conditions surrounding the Dallas area. The computer server 305 may have configuration information that includes that the shipment may be temperature sensitive and cannot be in environment less than 32 degrees Fahrenheit. Further, the computer server may have additional configuration information that if the shipment is at a location above a certain latitude or in a certain geographical area, to request the wireless tracker take a temperature reading with its temperature sensor and provide such temperature sensor information to the computer server 305. Further, if the computer server 305 is notified that the temperature is less than 32 degrees Fahrenheit, then the computer server may send a notification to shipper personnel to place the shipment in a warmer environment.

The control module 330 includes software and hardware functions that assist in performing certain tasks for the computer server 305 such as providing access to a communication link (e.g. wired, wireless, Bluetooth, infra-red, RF, etc.), executing an operating system, managing software drivers for peripheral components, and processing information. In addition, the control module 330 may also include software drivers for peripheral components, user interface computer programs, debugging and troubleshooting software tools. Also, the control module 330 may include an operating system. Such operating systems are known in the art for computer server 305 but may also include computer operating systems (e.g. Windows, Linux, UNIX, and MacOS, etc.).

The location based Continuous Inventory Management (CIM) module 332 includes software and hardware functions that assist in performing certain tasks for the computer server 305 such as associating the wireless tracker and the asset, monitoring cell phone inputs for location, ID and payload data. The Continuous Inventory Management (CIM) module 332 may also define a geo-fence at known warehouses, origins and destinations which are stored in the CIM module, it may also set an alert if the asset is not where it is planned to be at that time and send an alarm indicating unintended movement of the asset. The CIM module also keeps track of location of the asset and inventory.

The local server may act as an intermediary server at the warehouse and send local alerts and alarms directly from the warehouse.

Each of the communication interfaces (335-350) may be software or hardware associated in communicating to other devices. The communication interfaces (335-350) may be of different types that include a user interface, USB, Ethernet, WiFi, WiMax, wireless, optical, cellular, or any other communication interface coupled to a communication network. One or more of the communication interfaces (335-350) may be coupled to a user interface known in the art.

An intra-device communication link 355 between the processor bank 310, storage device bank 315, modules 317, and communication interfaces (335-350) may be one of several types that include a bus or other communication mechanism.

Figure 5:
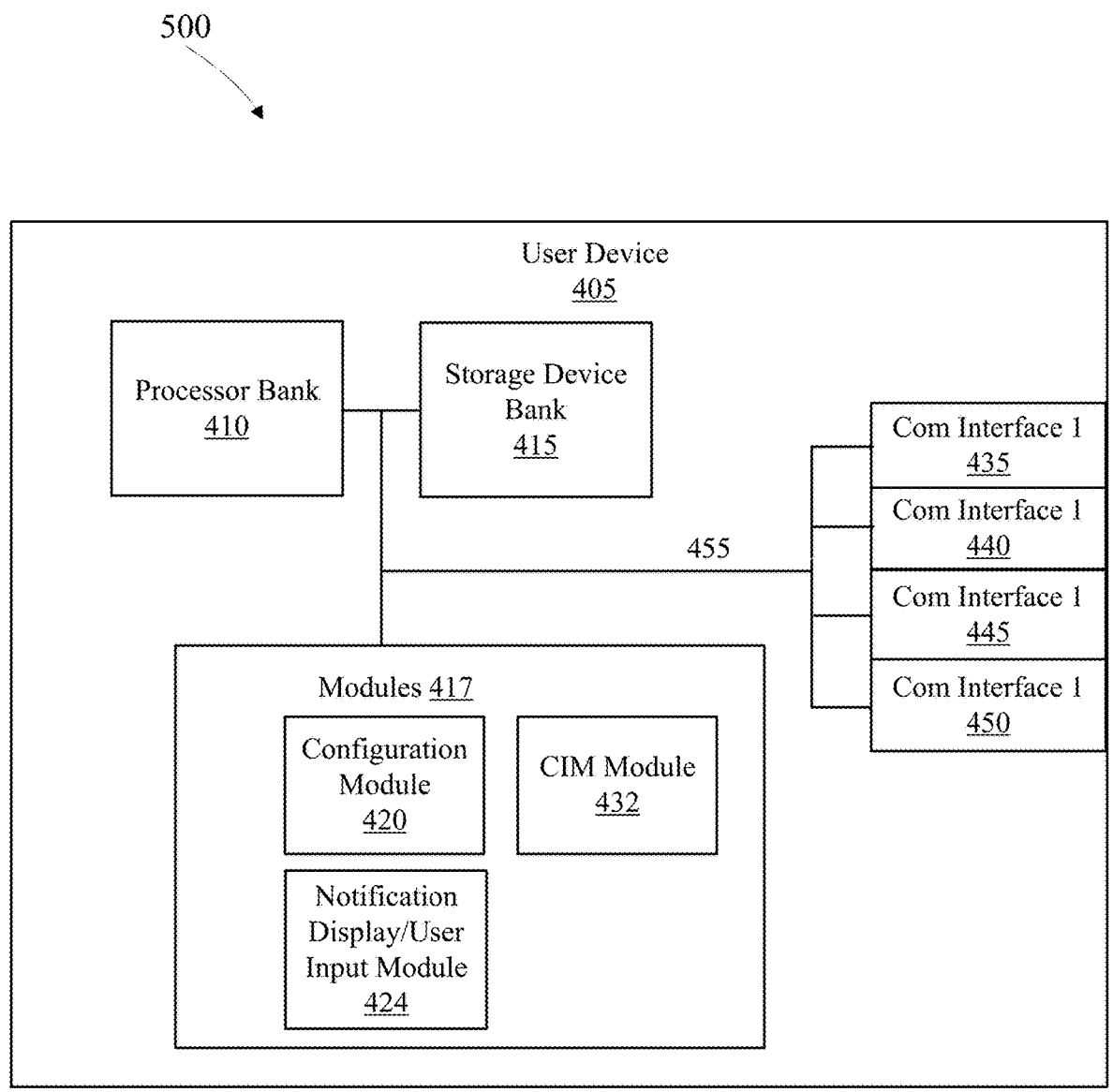
FIG. 5 depicts a functional block diagram a device used in continuous inventory management, in accordance with some embodiments.

FIG. 5 is functional block diagram of a user computing device 405 for providing configuration information to a wireless tracker as well as receiving trigger event notifications based on wireless tracker information, in accordance with some embodiments. Such a user device 405 may be used in a system shown in FIG. 1. The user device 405 may include several different components such as a processor bank 410, storage device bank 415, one or more software applications, which may be executed by a processor. Thus, the combination of the software applications as well as the processor and any other hardware form specifically-configured modules 417. The user device 405 also has one or more communication interfaces (435-450). The processor bank 410 may include one or more processors that may be co-located with each other or may be located in different parts of the shipper computing device 405. The storage device bank 415 may include one or more storage devices.

Types of storage devices may include electronic memory, optical memory, and removable storage media. The one or more modules 417 may include, but are not limited to, a configuration module 420 and a notification display/user input module 424. The modules 417 may be implemented by the one or more processors in the processor bank 410. Examples of user devices, include, but are not limited to, desktop computers, laptop computers, tablet computers, smartphones, and any other computing devices.

A user may provide configuration information for a wireless tracker. Such user input may be entered into a user interface (one or of the communication interfaces (435-450)) and may be received by the notification display/user input module 424. Such configuration information may include time and location of providing location and other sensor information of the wireless tracker as well as at which time periods to operate the different sensors of the wireless tracker to regulate its battery life. The configuration module 420 may process such configuration information and determine whether such user input may conflict with current operation of the wireless tracker or with a prior configuration of the wireless tracker. If so, the configuration module may provide a notification on the notification display 424. If not, the configuration information may then be transmitted to one or more computer servers over one of the communication interfaces (435-450). Also, the notification display/user input module 424 may receive a notification from the computer server(s) via the communication interface (435-450) and display such a notification on a user interface.

In some embodiments, the user device 405 may receive a notification from the wireless tracker (via a computer server) and present the notification to a user on a user device display. Further, the user may enter information into a user device user interface that may be transmitted to the wireless tracker (via the computer server) to take some further action. For example, a user may be tracking a shipment traveling from Las Vegas to Washington, D.C. (by air transport) with an intermediate stop in Dallas during the winter season. However, the user device 405 may receive a notification that the shipment was diverted to have an intermediate stop at Chicago instead of Dallas due to severe weather conditions surrounding the Dallas area. The shipment may be temperature sensitive and cannot be in environment less than 32 degrees Fahrenheit. The user may input information that is transmitted to the wireless tracker (via the computer server) to request the wireless tracker take a temperature reading with its temperature sensor and provide such temperature sensor information to the user device (via the computer server). Further, if the user is notified that the temperature is less than 32 degrees Fahrenheit, then the user may enter information to the computer server to notify shipper personnel to place the shipment in a warmer environment.

Each of the communication interfaces (435-450) may be software or hardware associated in communicating to other devices. The communication interfaces (435-450) may be of different types that include a user interface, USB, Ethernet, WiFi, WiMax, wireless, optical, cellular, or any other communication interface coupled to a communication network. One or more of the communication interfaces (435-450) may be coupled to a user interface known in the art.

The CIM module 432 includes software and hardware functions that assist in performing certain tasks for the mobile device such as receiving from the wireless tracker the tracker identification and payload, mating the location of the mobile device at that time to the tracker ID and sending the location of the mobile device, the ID and payload to the cloud server via an RF signal such as cellular, WiFi, WiMax and the like.

In one example, wireless devices are used for inventory management via Bluetooth tags and a server or mobile gateway to receive the identity broadcast by the tag and sensor information related to an asset. Without the need for human intervention, relevant data specifically related to an asset, product or package can be sent.

Bluetooth continuously broadcasts a unique ID and a payload which includes a fixed ID and sensor information including information about the environment. This broadcast is received by a mobile device or wireless tracker and is resent to a cloud server. This sensor information may be changed based on requirements, for example the sensor information, may provide data related to temp only, or temp and pressure and moisture, and the like.

A geo-fence may be set up and if a fixed ID is detected outside the geo-fence outside of a shipment plan, a problem may be detected. This action would occur without the need for human intervention as the system is continuously monitoring inventory.

An intra-device communication link 455 between the processor bank 410, storage device bank 415, modules 417, and communication interfaces (435-450) may be one of several types that include a bus or other communication mechanism.

Figure 6:
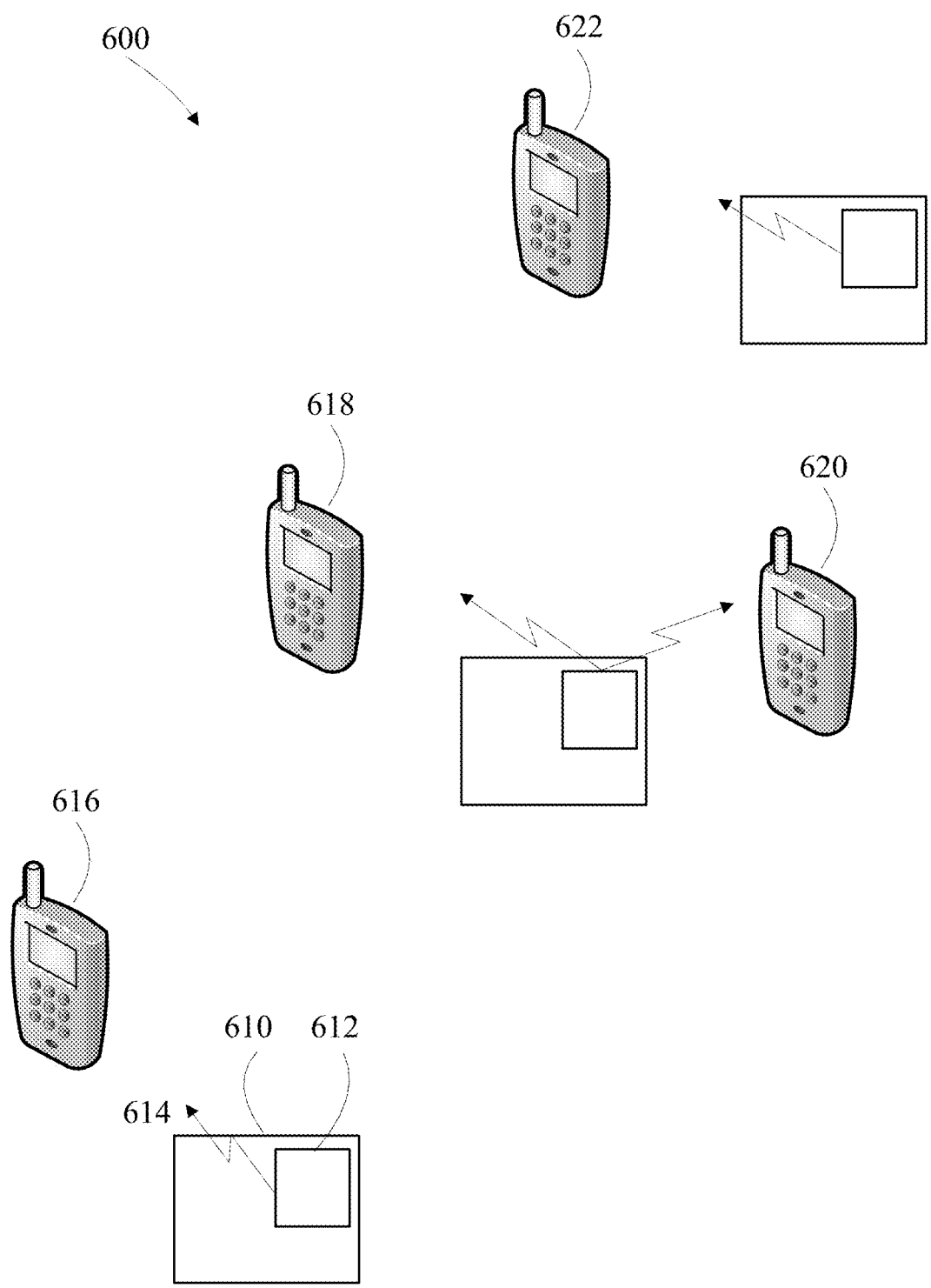
FIG. 6 is a diagram of a first example of continuous inventory management, in accordance with some embodiments.

FIG. 6 depicts an example in which the asset 610 having a wireless tracker such as a Bluetooth beacon transmits a wireless signal including an ID and sensor payload 614. Mobile device 616, 618, 620 and 622 each in turn receives the wireless signal and forwards the ID and sensor payload along with the mobile device location to the cloud server via an RF signal such as cellular, WiFi, WiMax and the like.

Figure 7:
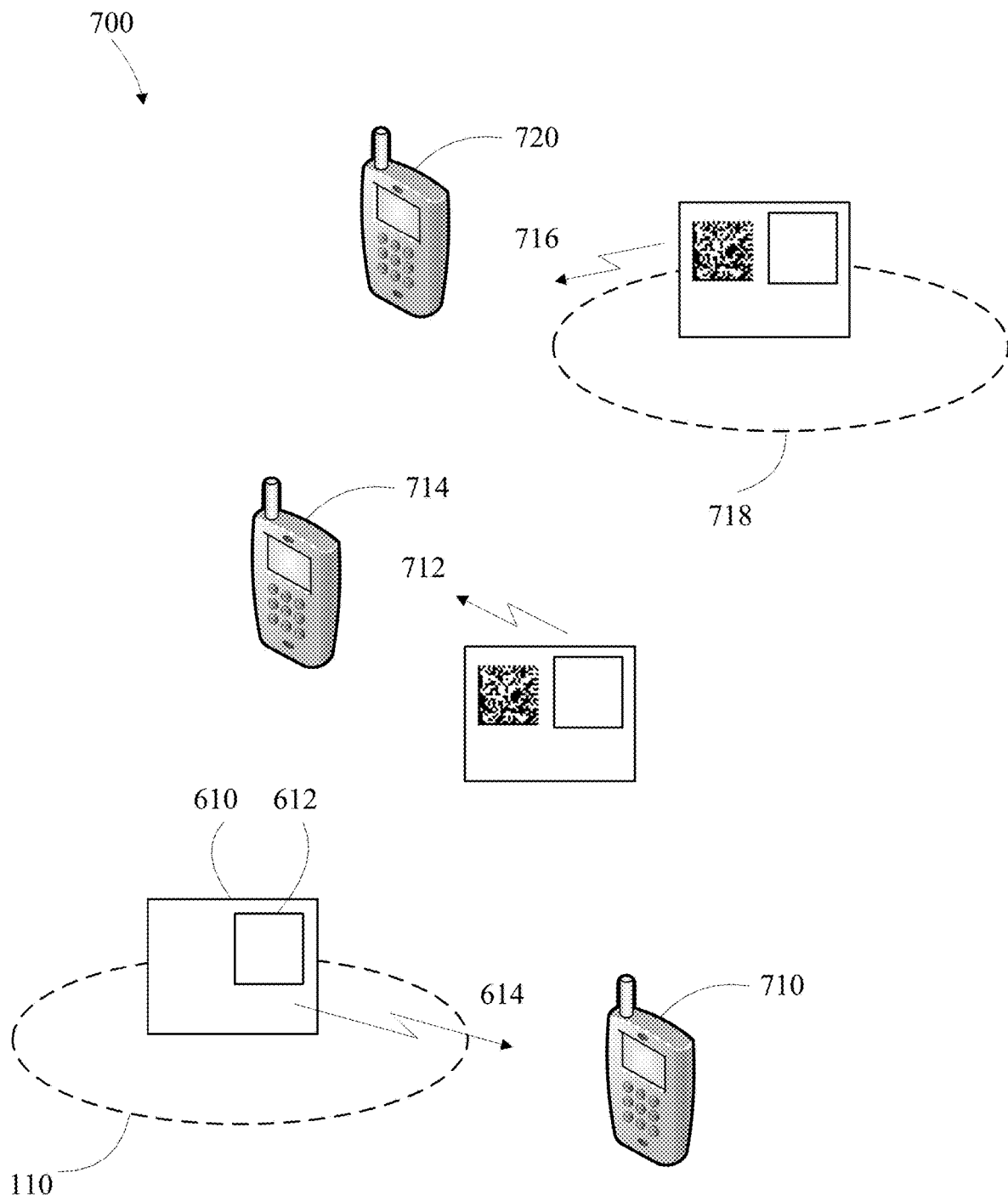
FIG. 7 is a diagram of a second example of continuous inventory management, in accordance with some embodiments.

FIG. 7 depicts an example in which an origin area 110 and destination area 718 are stored in the cloud server. The asset 610 having a wireless transmitter 612 emits a wireless signal including an ID and payload 614. In this example the asset 610 is detected by the mobile device 710 as being located within the origin area 110. When the asset moves outside of the origin area, a mobile device 714 such as a smart phone receives the wireless signal 712 and transmits the wireless signal and the cell phone location to the cloud server via an RF signal. The asset is also detected by mobile device 720 which is located in proximity to the destination area 718 by receiving wireless signal 716 being emitted by the asset from within the destination area. Mobile devices 710, 714 and 720 each transmitting the ID, payload and mobile device location to the cloud server.

Figure 8:
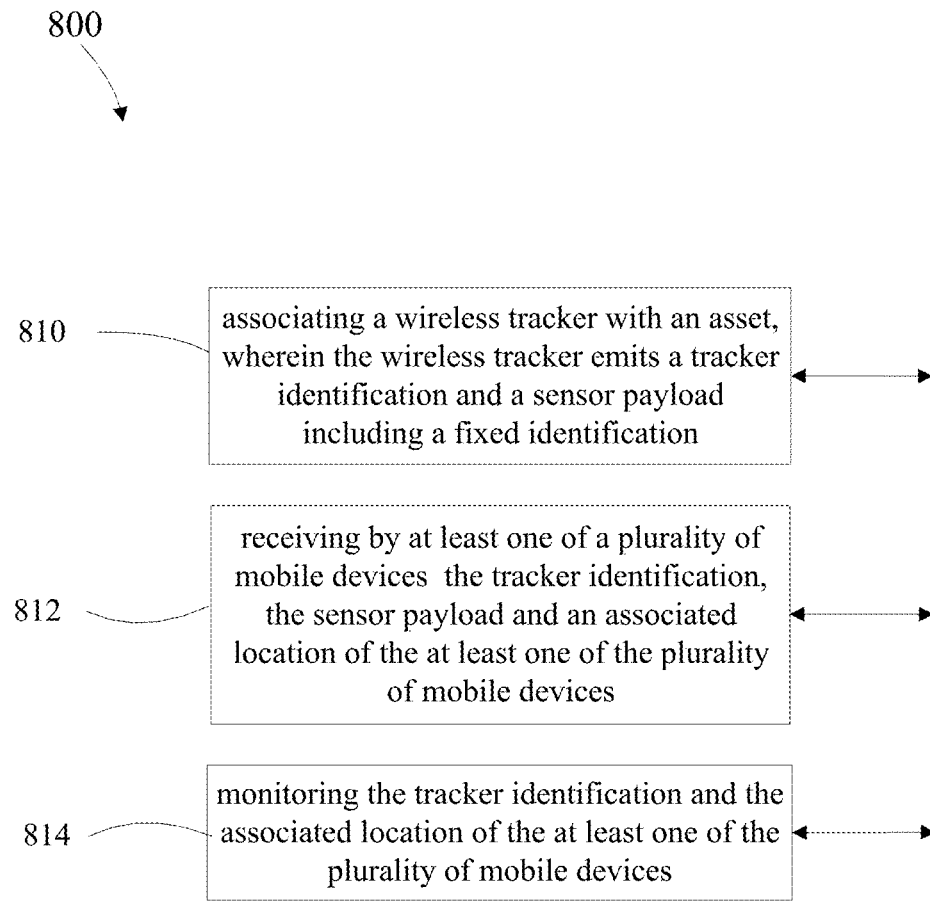
FIG. 8 is a flowchart that illustrates an example method of continuous inventory management, in accordance with some embodiments.

Referring to FIG. 8, an example method, including, associating 810 a wireless tracker with an asset, wherein the wireless tracker emits a tracker identification and a sensor payload including a fixed identification. The association of the wireless tracker with the asset in one embodiment is performed using a video scan of the asset either by static view or having the asset move on a conveyor belt so that a video may be taken of the asset. The method includes receiving 812 by at least one of a plurality of mobile devices the tracker identification, the sensor payload and an associated location of the at least one of the plurality of mobile devices and monitoring 814 the tracker identification and the associated location of the at least one of the plurality of mobile devices.

Persons of ordinary skill in the art understand that the steps of methods described herein can be implemented in any order and not limited to the order discussed in the present disclosure. Further, functions implemented by modules within the computer server(s) described herein may also be implemented in the modules of the wireless tracker. In addition, functions implemented by the module of the wireless tracker may also be implemented by the computer server(s). Moreover, functions implemented by modules within the computer server(s) described herein may also be implemented in the modules of the user device. Also, functions implemented by modules within the user device described herein may also be implemented in the modules of the computer server(s).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed. Additionally, the terms user device and mobile device called out within this document refer to a mobile device which the user utilizes.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:
    associating a wireless tracker co-located with an asset, wherein the wireless tracker emits a tracker identification and a sensor payload including a fixed identification;
    receiving a code via the wireless tracker at a shipment origin;
    receiving, by at least one of a plurality of mobile devices, the tracker identification, and the sensor payload as the asset and wireless tracker are moved from one location to another location;
    forwarding the tracker identification, the sensor payload, and an associated location of the at least one of the plurality of mobile devices to a server; and
    monitoring the tracker identification and the associated location of the at least one of the plurality of mobile devices;
    receiving another code at the wireless tracker at a shipment destination;
    determining that the location of the wireless tracker is within a distance threshold of the shipment destination; and
    transmitting a notification via the wireless tracker to the server to verify a chain of custody of the shipment when the another code was received by an authentication module of the wireless tracker within a time threshold and the distance threshold.

2. The method of claim 1, further comprising determining whether the tracker identification and associated location are located within a predefined geolocation.

3. The method of claim 2, further comprising setting an alert if the tracker identification and associated location are outside the predefined geolocation.

4. The method of claim 3, further comprising sending an alarm to a predetermined mobile device if the alert is set.

5. The method of claim 1, wherein the associating wireless tracker with the asset is performed utilizing a video scan of the asset.

6. The method of claim 1, wherein the location of the at least one of the plurality of mobile devices is via a global position system input.

7. The method of claim 1, wherein at least one of the associating, receiving and monitoring is performed by a cloud server.

8. The method of claim 1, wherein the wireless tracker is a transceiver.

9. The method of claim 1, wherein the sensor payload includes at least one of a temperature data, a humidity data, a pressure data and an acceleration data.

10. A system, comprising:
    a server configured to associate a wireless tracker co-located with an asset;
    a wireless tracker configured to receive a code at a shipment origin;
    a mobile device configured to
        receive a tracker identification and sensor payload from the wireless tracker as the asset and wireless tracker are moved from one location to another location;

forward the tracker identification, the sensor payload, and an associated location of the mobile device to the server;

wherein the server is also configured to monitor the tracker identification and the associated location of the mobile device;

wherein the wireless tracker is also configured to receive another code at a shipment destination;

wherein the server is also configured to determine that the location of the wireless tracker is within a distance threshold of the shipment destination;

wherein the wireless tracker is also configured to transmit a notification to the server to verify a chain of custody of the shipment when the another code was received by an authentication module of the wireless tracker within a time threshold and the distance threshold.

11. The system of claim 10, wherein the associating the wireless tracker with the asset is performed utilizing a video scan of the asset.

12. The system of claim 10, wherein the location of the at least one of the plurality of mobile devices is via a global position system input.

13. The system of claim 10, wherein the wireless tracker is a transceiver.

14. The system of claim 10, wherein the sensor payload includes at least one of a temperature data, a humidity data, a pressure data and an acceleration data.

15. A non-transitory computer readable medium comprising instructions that, when read by a processor, cause the processor to perform:

associating a wireless tracker co-located with an asset, wherein the wireless tracker emits a tracker identification and a sensor payload including a fixed identification;

receiving a code via the wireless tracker at a shipment origin;

receiving, by at least one of a plurality of mobile devices, the tracker identification, and the sensor payload as the asset and wireless tracker are moved from one location to another location;

forwarding the tracker identification, the sensor payload, and an associated location of the at least one of the plurality of mobile devices to a server;

monitoring the tracker identification and the associated location of the at least one of the plurality of mobile devices;

receiving another code at the wireless tracker at a shipment destination;

determining that the location of the wireless tracker is within a distance threshold of the shipment destination; and transmitting a notification via the wireless tracker to the server to verify a chain of custody of the shipment when the another code was received by an authentication module of the wireless tracker within a time threshold and the distance threshold.

16. The non-transitory computer readable medium of claim 15, further comprising determining whether the tracker identification and associated location are located within a predefined geolocation.

17. The non-transitory computer readable medium of claim 16, further comprising setting an alert if the tracker identification and associated location are outside the predefined geolocation.

18. The non-transitory computer readable medium of claim 17, further comprising sending an alarm to a predetermined mobile device if the alert is set.

19. The non-transitory computer readable medium of claim 15, wherein the associating the wireless tracker with the asset is performed utilizing a video scan of the asset.

20. The non-transitory computer readable medium of claim 15, wherein the sensor payload includes at least one of a temperature data, a humidity data, a pressure data and an acceleration data.

* * * * *

(12) INTER PARTES REVIEW CERTIFICATE (3389th)

United States Patent
Subramanian et al.

(10) Number: US 10,990,922 K1
(45) Certificate Issued: Jan. 25, 2024

(54) CONTINUOUS INVENTORY MANAGEMENT

(71) Applicants: Vidya Subramanian; Sanjay Sharma

(72) Inventors: Vidya Subramanian; Sanjay Sharma

(73) Assignee: ROAMBEE CORPORATION

Trial Number:
 IPR2022-00934 filed Apr. 29, 2022

Inter Partes Review Certificate for:
 Patent No.: 10,990,922
 Issued: Apr. 27, 2021
 Appl. No.: 16/266,025
 Filed: Feb. 2, 2019

The results of IPR2022-00934 are reflected in this inter partes review certificate under 35 U.S.C. 318(b).

INTER PARTES REVIEW CERTIFICATE
U.S. Patent 10,990,922 K1
Trial No. IPR2022-00934
Certificate Issued Jan. 25, 2024

AS A RESULT OF THE INTER PARTES REVIEW PROCEEDING, IT HAS BEEN DETERMINED THAT:

Claims 1-20 are cancelled.

\* \* \* \* \*